ADJUSTABLE MOUNTING FOR PHONOGRAPH PICKUPS

Filed April 4, 1963

INVENTOR.
Clarence F. Jensen,
BY
By Donald A. Welsh
Attorney.

3,176,993

ADJUSTABLE MOUNTING FOR PHONOGRAPH PICKUPS

Clarence F. Jensen, Lombard, Ill., assignor to Jensen Industries, Inc., Addison, Ill., a corporation of Illinois Filed Apr. 4, 1963, Ser. No. 271,049
16 Claims. (Cl. 274—24)

This invention relates generally to an electro-mechanical phonograph pickup and more particularly to the type of pickup in which a record engaging stylus and an electromechanical transducing element are assembled together as a cartridge unit mounted in a tone arm and replaceable when the stylus becomes worn or the cartridge becomes inoperable. In some instances, there are two styli on the cartridge to accommodate different sizes of record grooves and these are brought separately into operative position for engagement with a record by moving the cartridge relative to the arm.

The primary object of the invention is to reduce initial manufacturing and replacement costs of cartridges in pickups of the above character by the provision of a single cartridge and mounting which are constructed in a novel manner for use with widely varying tone arms of different manufacturers.

Another object is to provide a novel adjustable cartridge mounting which, while accommodating different sizes and shapes of tone arms, always centers the cartridge with respect to the arm.

Still another object is to form the mounting of parts which are constructed easily and inexpensively by metal stamping and bending and screw machine operations.

A more detailed object is to mount the cartridge on a tone arm for relative adjustment through the medium of a bracket accommodating different tone arms and a clip replaceably receiving the cartridge and supporting the same for adjustment relative to the bracket and the arm to present the different styli in the operative record engaging position.

A further detailed object is to achieve positive and accurate location of styli relative to the tone arm by constructing the cartridge and clip in a novel manner with complementary and interlocking surfaces permitting their assembly releasably in only one predetermined position.

The invention also resides in the novel and simple construction of the mounting bracket and its connection to the clip.

Other objects and advantages of the invention will become apparent from the following detailed description taken in connection with the accompanying drawings in which.

Figures 1, 2, 3:
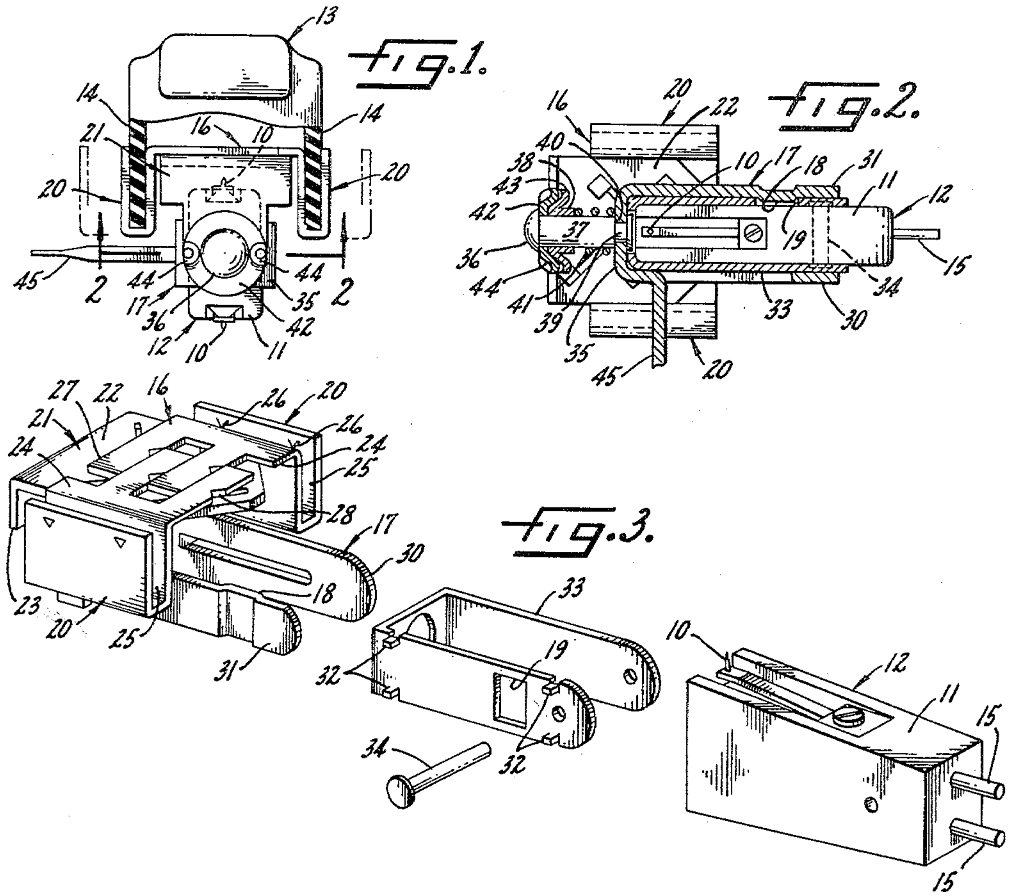
FIGURE 1 is an end view of a cartridge and its mounting embodying the novel features of the present invention, the cartridge being supported on a tone arm which is broken away and shown in section.
FIG. 2 is a sectional view of the cartridge and mounting taken along the line 2—2 of FIG. 1.
FIG. 3 is an exploded perspective view of the cartridge and mounting.
Figure 4:
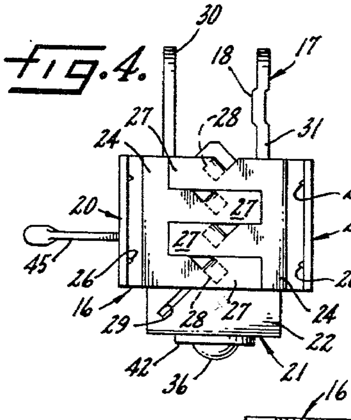
FIG. 4 is a top plan view of the mounting with the cartridge removed.

While the invention is susceptible of various modifications and alternative constructions, I have illustrated in the drawings and will herein describe the preferred embodiment. It is to be understood, however, that I do not hereby intended to limit the invention by such disclosure but that I aim to cover all modifications and alternative constructions falling within the spirit and scope of the invention as expressed in the appended claims.

The invention is shown in the drawings for purposes of illustration embodied in a phonograph pickup of the type in which two styli 10 and an electro-mechanical transducer element (not shown) are assembled in a housing 11 to form a cartridge 12. The cartridge is removably mounted on a tone arm 13 of the pickup and also is adjustable to present one stylus or the other at a time in operative position to engage a record, the styli being of different sizes for use with record grooves of different sizes. The tone arm, as is well known in the art, is supported in a horizontal position above a reord and is of downwardly opening chanel shape with spaced walls 14 disposed in generally parallel relation in vertical planes straddling the cartridge. Tone arms of various manufacturers, although having the inverted channel shape, often differ in the spacing of the vertical walls.

The cartridge 12, in the present instance, is of generally rectangular shape and the styli 10 are exposed on opposite sides adjacent one end of the cartridge. Projecting from the other end are two plug pins 15 which are provided for electrical connections to the transducer element within the housing. When the cartridge is mounted on the tone arm 13, it extends beneath the arm with one stylus or the other projecting downwardly in operative position to engage a record beneath the arm.

In accordance with the invention, both initial and replacement costs of the cartridge 12 and its mounting are reduced by constructing these parts in a novel manner for use with tone arms 13 of different manufacturers while still permitting easy replacement of the cartridge and providing the desired adjustability to render the different styli 10 effective selectively. To this end, the mounting comprises a bracket 16 which is adjustable to fit different tone arms and a clip 17 releasably interlocked with the cartridge and mounted on the bracket to provide the adjustment of the styli relative to the arm. To insure accurate location of the respective styli, unsymmetrical complementary surfaces on the clip and the cartridge permit assembly of these parts in only one predetermined position and prevent their assembly in any other position. Cooperating recessed and projecting parts 18 and 19 interlock with each other to hold the clip and cartridge assembled in their one predetermined position while being releasable to permit replacement of the cartridge.

The low cost of the cartridge mounting is achieved by constructing the bracket 16 of only three parts which may be formed easily as sheet metal stampings. To achieve the desired adjustment to accommodate tone arms of different dimensions, two of these parts are slides 20 which interlock with and are shiftable relative to the third part, a support 21. The latter is of L-shape with one leg 22 interlocking with and supported horizontally on the tone arm 13 by the slides. Its other leg 23 is disposed in an upstanding position with respect to the tone arm and rotatably supports the clip.

Each slide 20 also is of L-shape with one leg 24 lying against and slidable relative to the horizontal leg 22 of the support 21. The other leg 25 of each slide is formed as a channel extending laterally from the horizontal support leg in the same direction as the vertical support leg 23 but opening in the opposite direction to receive the side walls 14 of the tone arm 13. Movement of the slides relative to the support is in a direction extending transversely of the horizontal support leg so that the channels are movable toward and away from each other thereby adapting the bracket to receive tone arm walls of different horizontal spacing. To hold the bracket assembled to the tone arm walls, pointed lugs 26 are bent inwardly from the sides of the channels to engage and frictionally grip the tone arm walls, the lugs pointing downwardly so as to avoid interference with entry of the walls into the channels but to dig into the walls to grip the same frictionally and hinder their withdrawal from the channels.

The sliding connection between the slides 20 and the horizontal support leg 22 not only maintains the channels 25 in parallel relation but also keeps the support 21 in a centered position between the channels. The parallel relation of the channels is obtained by formation of the horizontal slide legs 24 with spaced rectangular guides 27 which project from the channels and into overlapping relation with each other transversely of the horizontal support leg 22 so as to interfit to prevent shifting of the slides longitudinally of the support leg. Two guides are formed on one slide and at least one guide is formed on the other slide and is straddled by the overlapping parts of the two guides of the first slide. While the desired guiding and support are achieved with only one guide on one slide projecting between the two guides on the other slide, it is preferred to form two parallel guides on each slide as shown in the drawing.

The guides 27 are maintained in their sliding assembled relation with the support leg 22 by a novel arrangement of lugs or tabs 28 and slots 29 which also center the support with respect to the channels in all positions of the slides. Although the lugs may be formed on the leg and project into slots formed in the guides, it is preferred to cut the slots in the leg and to form the lugs as integral projections of the guides first bent laterally and through the slots and then bent reversely to lie along the other side of the support leg. Centering of the support with respect to the channels is effected by extending the slots 29 at an acute angle with respect to a central plane paralleling and disposed equidistantly from the channels. Herein, there is a pair of parallel slots on each side of the plane and each slot receives one lug bent from an associated guide, there being two guides 27 on each slide to correspond to the slots.

The clip 17, like the mounting bracket 16, is formed easily and inexpensively by sheet metal stamping and bending operations. To this end, the clip is U-shape with laterally spaced legs 30 and 31 straddling and supporting the cartridge with its longitudinal axis paralleling and disposed equidistantly between the legs. This axis coincides with the axis of rotation of the clip with respect to the vertical leg 23 of the mounting bracket support 21, the coinciding axes being normal to such vertical leg and being disposed parallel to and equidistant from the channels 25. In its rotation, the cartridge moves through a half revolution between two limit positions in which the respective styli 10 are disposed directly beneath the mounting and tone arm 13 for operative engagement with a record moving beneath the arm.

To position the cartridge 12 positively in the clip 17 with the cartridge axis and the axis of rotation of the clip coinciding, at least one leg of the clip fits into a complementary recessed portion of the cartridge. One leg also is dimensioned or shaped differently from the other leg to provide the desired interfitting of the cartridge in only one predetermined position while preventing its assembly in any other position in the clip. This insures a predetermined orientation of the cartridge with respect to the tone arm so that, in each of the two different limit positions of the cartridge relative to the arm 13, a different one of the styli 10 always is located in the operative position to engage a record.

In the present instance, the clip legs 30 and 31 are dimensioned differently by making one leg 31 narrower than the other. The narrower leg fits into a recess on the cartridge housing 11 defined by lugs 32 bent outwardly from a U-shaped strip 33 of metal secured along two sides and the end of the housing remote from the electrical connecting pins 15 by a rivet 34 extending through the legs of the strip and through the housing.

The spacing between the inner sides of the clip legs is equal approximately to the spacing of the outer sides of the legs of the metal strip 33 so that the strip and housing fit snugly between the legs and are prevented by such fit from turning relative to the clip. The interlocking parts on the clip 17 and cartridge 12 retaining the cartridge assembled between the clip legs and against the closed end 35 of the U are a projecting rectangular section 18 bent inwardly from the narrower clip leg 31 intermediate its ends and a hole 19 formed in the leg of the strip 33 against which the narrower clip leg lies.

The rotary mounting of the clip 17 on the vertical support leg 23 is achieved using a single screw machine part 36 and parts integral with the leg. The screw machine part is a rivet having a shank 37 secured rigidly to the closed end 35 of the clip and rotatably supported in a bearing 38 formed by an upset portion of the support leg 23 bent laterally from the leg to form a cylinder while leaving a hole through which the shank extends. A reduced end portion 39 of the shank extends through a hole in the closed end 35 of the clip, such closed end being secured against a shoulder 40 at the end of the reduced end portion by upsetting the extreme outer end of the shank against the inner side of the closed end.

The clip 17 and shank 37 are held assembled to the vertical support leg 23 by a helical spring 41 encircling the shank and acting in compression between the closed end 35 of the clip and the cylindrical bearing 38 on the inner side of the support leg to hold an enlarged head 42 on the shank against the outer side of the leg. This arrangement permits turning of the cartridge 12 while creating a friction between the head and the support leg to hold the cartridge in its limit positions. To augment such friction, projecting and recessed parts 43 and 44 are formed on the leg and the rivet head, these parts interfitting releasably in the limit positions. Herein, these parts are recessed portions 43 formed on the outer side of the leg and lugs 44 of complementary shape bent inwardly from the head and fitting into the recesses, the lugs and recesses being spaced angularly around the shank and bearing. In the limit positions, the lugs thus engage the leg at points spaced radially and outwardly beyond the cylindrical bearing and angularly spaced about the bearing so as to stabilize the cartridge and clip against movement relative to the support.

To facilitate turning of the cartridge 17 with respect to the tone arm 13 after the bracket 16 is mounted on the arm, a handle 45 projects outwardly from the clip and radially from the clip axis and beyond the channels. This handle conveniently is formed by striking out a part of the wider clip leg 30 during the formation of the clip.

Assuming that the strip 33 has been secured to the cartridge housing 11 and that the other parts have been formed in their stamping, bending and screw machine operations, the slides 20 are assembled first to the horizontal support leg 22 by extending the lugs 28 through the slots 29 and bending them reversely against the upper side of that leg. Then, the rivet 37 is extended through its bearing 38, the helical spring 41 and finally the closed end 35 of the clip, and its end portion is upset against the clip to secure the rivet and clip rigidly together, such upsetting taking place in a suitable fixture (not shown). The cartridge 12 then is inserted in the clip in the only position possible with the narower clip leg 31 fitting in the recess defined by the lugs 32 on the strip 33. When the cartridge reaches and abuts the closed end of the U, the projecting section 18 of the narrower clip leg drops into the hole 19 in the strip to lock the cartridge releasably to the clip.

Figure 5:
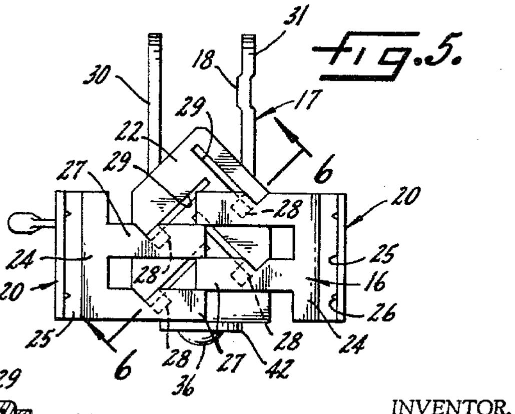
FIG. 5 is a view similar to FIG. 4 but showing the tone arm engaging parts in different positions.
Figure 6:
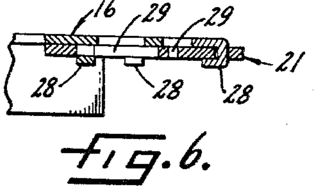
FIG. 6 is a sectional view taken along the line 6—6 of FIG. 5.

When the cartridge 12, clip 17, and bracket 16 are to be mounted on a tone arm 13, the slides 20 are shifted relative to each other until the spacing of the channels 25 is equal approximately to the spacing of the side walls 14 of the tone arm, the spacing of the channels varying between their closest positions as shown in FIG. 5 and in phantom in FIG. 1, the full line position of FIG. 1 being intermediate the limit positions. Then, the slides are shifted to insert the tone arm walls into the channels until the lower edges of the walls engage the bottoms of the channels. This movement is permitted by the pointed lugs 26 which, when the movement is completed, bite into or grip the tone arm walls to prevent withdrawal of the walls from the channels. The bracket thus is secured to the tone arm and the cartridge is centered with respect to the arm automatically by the inclined slots 29 in the horizontal support leg 22 in cooperation with the guides 27 on the slides. With the bracket secured on the tone arm, the cartridge is disposed beneath the arm with either one stylus 10 or the other in operative position relative to the arm corresponding to the limit positions of the cartridge determined by the lugs 42 on the rivet head and the recesses 43 in the vertical support leg 23, the locations of these lugs and recesses being correlated with the locations of the styli so that, in the limit positions of the cartridge movement, the styli are exposed directly beneath the cartridge.

It will be apparent that the novel cartridge mounting described above is made up of few parts and, except for the spring 41, these are formed easily from sheet metal stamping and bending operations and in screw machine operations. By virtue of adjustment of the slides 20, the bracket 16 accommodates tone arms 13 with widely varying spacings of the tone arm walls 14 while insuring that the cartridge always is centered with respect to such walls. Due to the novel construction of the cartridge clip 17 and in its rotary mounting on the vertical support leg 23, stability and accurate positioning of the cartridge are insured.

This application is a continuation in part of my pending application, Serial No. 166,878, filed January 17, 1962, and now abandoned.

I claim:

1. In a phonograph pickup adapted for use with a tone arm, the combination of a bracket adapted to interfit with and be supported by tone arms of different dimensions and having a bearing defining an axis of rotation disposed horizontally beneath a supporting arm, a shaft journaled in said bearing, a clip of U-shape having laterally spaced legs and a closed end secured to said shaft with the legs paralleling and straddling said axis, a cartridge disposed between and supported by said clip legs and having two styli angularly spaced about said axis to be brought individually into an operative pickup position beneath the arm as an incident to rotation of the clip about the axis, said clip and said cartridge having complementary interfitting surfaces permitting assembly in only one relative position and engaging each other to prevent assembly of the clip and cartridge in other positions, and locking elements on said clip and said cartridge releasably holding the same assembled in said one position.

2. In a phonograph pickup adapted for use with a tone arm having laterally spaced, generally parallel walls normally disposed in vertical planes, the combination of an L-shaped support having first and second legs, slides adjustably mounted on said first support leg and adapted to interengage tone arm walls of different spacing to mount the support of the arm with the first leg disposed horizontally and said second leg disposed vertically, said second leg having a bearing defining an axis of rotation normal to the leg and paralleling said first leg, a shaft journaled in said bearing, a clip of U-shape having laterally spaced legs and a closed end secured to said shaft with the legs paralleling and straddling said axis, and a cartridge disposed between and supported by said clip legs and having two styli angularly spaced about said axis to be brought individually into an operative pickup position beneath the arm as an incident to rotation of the clip.

3. In a phonograph pickup adapted for use with a tone arm, the combination of a bracket having slides adjustably mounted thereon and adapted to interfit with and be supported by tone arms of different dimensions and having a bearing defining an axis of rotation normally disposed horizontally beneath a tone arm supporting the bracket, a shaft journaled in said bearing, a clip of U-shape having laterally spaced legs and a closed end secured to said shaft with the legs paralleling and straddling said axis, and a cartridge disposed between and supported by said clip legs and having two styli angularly spaced about said axis to be brought individually into an operative pick-up position beneath the arm as an incident to rotation of the clip.

4. In a photograph pickup adapted for use with a tone arm, the combination of a bracket adapted to interfit with and be supported by tone arms of different dimensions, a clip mounted on said bracket for rotation, a cartridge mounted on said clip and having two styli angularly spaced about said axis to be brought individually into an operative pickup position beneath the arm as an incident to rotation of the clip, said clip and said cartridge having complementary interfitting surfaces permiting assembly in only one relative position and engaging each other to prevent assembly of the clip and cartridge in other positions, and locking elements on said clip and said cartridge releasably holding the same assembled in said one position while permitting the clip to be removed from the cartridge.

5. In a phonograph pickup adapted for use with a tone arm having laterally spaced, generally parallel walls normally disposed in vertical planes, a mounting bracket having, in combination, a support of L-shape having first and second generally flat legs intersecting approximately at a right angle and disposed normal to a central plane, two L-shaped slides each having spaced parallel guides on one leg projecting toward and slidably interfitting with the guides of the other slide and lying across and flat against said first support leg, the other legs of said slides being formed as channels straddling and paralleling said plane and opening in the same direction to receive said tone arm walls individually, said first support leg having at least two pairs of parallel slots with the slots of each pair disposed on opposite sides of said plane and disposed at the same acute angle with repect to the plane, tabs on said guides extending through said slots and interlocking with said first support leg to guide the movement of the guides and retain the slides assembled to the support as the channels are shifted toward and away from each other, each of said channels having laterally spaced walls and at least one lug projecting inwardly from one wall to engage and frictionally grip a tone arm wall within the channel, and means on said second support leg adapted to support a stylus and transducer element.

6. In a phonograph pickup adapted for use with a tone arm having laterally spaced, generally parallel walls normally disposed in vertical planes, a mounting bracket having, in combination, a support of L-shape having first and second generally flat legs intersecting approximately at a right angle and disposed normal to a central plane, two L-shaped slides each having spaced parallel guides on one leg projecting toward and slidably interfitting with the guides of the other slide and lying across and flat against said first support leg, the other legs of said slides being formed as channels straddling and paralleling said plane and opening in the same direction to receive said tone arm walls individually, said first support leg having at least two pairs of parallel slots with the slots of each pair disposed on opposite sides of said plane and disposed at the same acute angle with repect to the plane, tabs on said guides extending through said slots and interlocking with said first support leg to guide the movement of the guides and retain the slides assembled to the bracket as the channels are shifted toward and away from each other, and means on said second support leg adapted to support a stylus and transducer element.

7. In a phonograph pickup adapted for use with a tone arm having laterally spaced, generally parallel walls normally disposed in vertical planes, a mounting bracket having, in combination, a flat support member, two L-shaped slides each having two legs and spaced parallel guides on one leg projecting toward and slidably interfitting with the guides of the other slide and lying across and flat against said support member, the other legs of said slides being formed as channels paralleling each other and opening in the same direction to receive said tone arm walls individually, means on said guides interlocking with said support member to guide the movement of the guides and retain the slides assembled to the member as the channels are shifted toward and away from each other, and means on said support member adapted to support a stylus and transducer element.

8. In a phonograph pickup adapted for use with a tone arm, a mounting bracket having, in combination, a flat support member disposed normal to a central plane, two slides each adapted to interfit with a different part of a tone arm and having flat spaced parallel guides projecting toward and slidably interfitting with the guides of the other slide and lying across and flat against said support member, said member having at least two pairs of parallel slots with the slots of each pair disposed on opposite sides of said plane and disposed at the same acute angle with respect to the plane, tabs on said guides extending through said slots and bent reversely to interlock with said member to guide the movement of the guides and retain the slides assembled to the bracket as the slides are shifted toward and away from each other, and means on said member adapted to support a stylus and transducer element.

9. In a phonograph pickup having a tone arm, the combination of, a clip of U-shape having laterally spaced first and second legs and a closed end and mounted on said tone arm for rotation about an axis extending through the closed end, longitudinally of the legs and tone arm, and between the legs, said first leg having one dimension different from the same dimension of said second leg, a handle formed integrally with and projecting laterally from one of said legs, a cartridge containing transducer and stylus elements and supported by and between said clip legs, said cartridge having at least one recess with dimensions complementary to the dimensions of one of said legs so that the leg fits closely in the recess in only one position of the clip with respect to the cartridge and assembly of the two parts in other positions is blocked, and projecting and recessed parts on one of said legs and an adjacent portion of said cartridge interfitting when said clip is in said one position to hold the clip and cartridge assembled releasably in such position.

10. In a phonograph pickup having a tone arm, the combination of, a clip of U-shape having laterally spaced first and second legs and a closed end and mounted on said tone arm for rotation about an axis extending through the closed end, longitudinally of the legs and tone arms, and between the legs, said first leg having one dimension different from the same dimension of said second leg, a handle formed integrally with and projecting laterally from one of said legs, and a cartridge containing transducer and stylus elements and supported by and between said clip legs, said cartridge having at least one recess with dimensions complementary to the dimensions of one of said legs so that the leg fits closely in the recess in only one position of the clip with respect to the cartridge and assembly of the two parts in other positions is blocked.

11. In a phonograph pickup having a tone arm, the combination of, a clip of U-shape having laterally spaced first and second legs and a closed end and mounted on said tone arm for rotation about an axis extending through the closed end, longitudinally of the legs and tone arm, and between the legs a cartridge containing transducer and stylus elements and supported by and between said clip legs, said cartridge and clip having interfitting parts permitting assembly of the clip in only one position with respect to the cartridge and engaging each other to prevent assembly of the clip and cartridge in any other position, and interlocking parts on one of said legs and an adjacent portion of said cartridge interfitting when said clip is in said one position to hold the clip and cartridge assembled releasably in such position.

12. In a phonograph pickup having a tone arm, the combination of, a clip of U-shape having laterally spaced first and second legs and a closed end and mounted on said tone arm for rotation about an axis extending through the closed end, longitudinally of the legs and tone arm, and between the legs, said first leg having one dimension different from the same dimension of said second leg, a handle formed integrally with and projecting laterally from one of said legs and a cartridge containing transducer and stylus elements and supported by and between said clip legs, said cartridge and clip having interfitting parts permitting assembly of the clip in only one position with respect to the cartridge and preventing assembly of the clip and cartridge in any other position.

13. In a phonograph pickup adapted for use with a tone arm having laterally spaced, generally parallel walls normally disposed in vertical planes, a mounting bracket having, in combination, a flat support member, two L-shaped slides each having a first leg lying flat against said support member and a second leg formed as a channel, said second legs paralleling each other and opening in the same direction to receive said tone arm walls individually, said first leg of a first one of said slides having spaced parallel guides projecting toward the second leg of the other slide and said first leg of the other slide having at least one guide projecting toward said second leg of the first slide and slidably interfitting with said guides of said first slide to guide said channels for movement toward and away from each other, said member and said guides having tab and slot parts interlocking with each other to retain the guides assembled against the member and maintain said channels in parallel relation as the channels are moved toward and away from each other, and means on said support member adapted to support a stylus.

14. In a phonograph pickup adapted for use with a tone arm having laterally spaced, generally parallel walls normally disposed in vertical planes, a mounting bracket having, in combination, a flat support member, two L-shaped slides each having a first leg lying flat against said support member and a second leg formed as a channel, said second legs paralleling each other and opening in the same direction to receive said tone arm walls individually, said first leg of a first one of said slides having spaced parallel guides projecting toward the second leg of the other slide and said first leg of the other slide having at least one guide projecting toward said second leg of the first slide and slidably interfitting with said guides of said first slide to guide said channels for movement toward and away from each other, means on said guides interlocking with said support member to retain the slides assembled to the member as the channels are shifted toward and away from each other, and means on said support member adapted to support a stylus.

15. In a phonograph pickup adapted for use with a tone arm having laterally spaced, generally parallel walls normally disposed in vertical planes, a mounting bracket having, in combination, a flat support member, two L-shaped slides each having first and second legs, said first legs of said slides lying across and flat against said support member, spaced parallel guides on said first leg of one of said slides projecting toward and slidably interfitting with at least one guide on said first leg of the other slide, said second legs of said slides being formed as channels paralleling each other and opening in the same direction to receive said tone arm walls individually, means on said guides interlocking with said support member to guide the movement of the guides and retain the slides assembled to the member as the channels are shifted toward and away from each other, and means on said support member adapted to support a stylus.

16. In a phonograph pickup adapted for use with a tone arm, a mounting bracket having, in combination, a flat support member disposed normal to a central plane, two slides adapted to interfit with different parts of a tone arm and having flat spaced parallel guides projecting toward and slidably interfitting with each other and lying across and flat against said support member, said member and said guides having tab and slot parts interlocking with each other to guide the movement of the guides and retain the slides assembled to the bracket as the slides are shifted toward and away from each other, and means on said member adapted to support a stylus.

References Cited in the file of this patent

UNITED STATES PATENTS

| | | |
|---|---|---|
| 2,699,470 | Koren | Jan. 11, 1955 |
| 3,032,614 | Pennucci | May 1, 1962 |

FOREIGN PATENTS

| | | |
|---|---|---|
| 1,256,439 | France | Feb. 6, 1961 |